United States Patent
Piovano (10) Patent No.: US 10,380,452 B1
(45) Date of Patent: Aug. 13, 2019

(54) SYSTEMS AND METHODS FOR IDENTIFYING SALIENT IMAGES

(71) Applicant: GoPro, Inc., San Mateo, CA (US)

(72) Inventor: Jerome Piovano, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 96 days.

(21) Appl. No.: 15/594,429

(22) Filed: May 12, 2017

(51) Int. Cl.
- *G06K 9/62* (2006.01)
- *G06K 9/46* (2006.01)
- *G06T 7/50* (2017.01)

(52) U.S. Cl.
CPC ......... *G06K 9/4676* (2013.01); *G06K 9/4652* (2013.01); *G06K 9/6267* (2013.01); *G06T 7/50* (2017.01); *G06T 2210/12* (2013.01)

(58) Field of Classification Search
CPC ............. G06K 9/4671–9/4676; G06T 2210/12
See application file for complete search history.

(56) References Cited

U.S. PATENT DOCUMENTS

| 2017/0147900 A1* | 5/2017 | Booth .................. G06K 9/4676 |
| 2018/0027145 A1* | 1/2018 | Kurzhanskiy ........ H04N 1/3873 382/283 |
| 2018/0189937 A1* | 7/2018 | Bala .......................... G06T 5/50 |

OTHER PUBLICATIONS

Zhang et al., "Minimum Barrier Salient Object Detection at 80 FPS", 2015 IEEE International Conference on Computer Vision, pp. 1404-1412. (Year: 2015).*

Zhu et al., "Saliency Optimization from Robust Background Detection", CVPR2014, published in 2014, pp. 1-8. (Year: 2014).*

Zhong et al., "A Semantic No-Reference Image Sharpness Metric Based on Top-Down and Bottom-Up Saliency Map Modeling", Proceedings of 2010 IEEE 17th International Conference on Image Processing, Sep. 26-29, 2010, Hong Kong, pp. 1553-1556. (Year: 2010).*

Jie Feng et al., "Salient Object Detection by Composition", 2011 IEEE International Conference on Computer Vision, pp. 1028-1035. (Year: 2011).*

Bogdan Alexe, "Measuring the Objectness of Image Windows", IEEE Transactions on Pattern Analysis and Machine Intelligence, vol. 34, No. 11, Nov. 2012, pp. 2189-2202. (Year: 2012).*

Jianming Zhang, et al.; Minimum Barrier Salient Object Detection at 80 FPS; 2015; To Appear in Proc. IEEE International Conference on Computer Vision (ICCV); pp. 1-9.

Rui Zhao, et al.; Saliency Detection by Multi-Context Deep Learning; 2015; Computer Vision Foundation; IEEE Xplore; pp. 1265-1274.

Robinson, et al.; Saliency Detection by Multi-Context Deep Learning; Apr. 6, 2004; Vision Systems Group; pp. 1-13.

* cited by examiner

Primary Examiner — Brian Werner
(74) Attorney, Agent, or Firm — Esplin & Associates, PC (57) ABSTRACT

Image information defining an image may be accessed. The image may include one or more salient objects. A saliency map may be generated based on the image information. The saliency map may include one or more regions corresponding to the one or more salient objects. The one or more regions may be characterized by different levels of intensity than other regions of the saliency map. One or more salient regions around the one or more salient objects may be identified based on the saliency map. A saliency metric for the image may be generated based on one or more of (1) sizes of the one or more salient regions; (2) an amount of the one or more salient regions; and/or (3) histograms within the one or more salient regions.

20 Claims, 5 Drawing Sheets

SYSTEMS AND METHODS FOR IDENTIFYING SALIENT IMAGES

FIELD

This disclosure relates to identifying salient images based on size, amount, and histogram within salient regions of images.

BACKGROUND

Manually identifying salient portions of images/salient images for image/video processing may be time consuming. Quickly and efficiently identifying salient portions of images/salient images may encourage users to capture/view/edit images/videos.

SUMMARY

This disclosure relates to identifying salient images. Image information defining an image may be accessed. The image may include one or more salient objects. A saliency map may be generated based on the image information. The saliency map may include one or more regions corresponding to the one or more salient objects. The one or more regions may be characterized by different (e.g., higher) levels of intensity than other regions of the saliency map. One or more salient regions around the one or more salient objects may be identified based on the saliency map. A saliency metric for the image may be generated based on one or more of (1) sizes of the one or more salient regions; (2) an amount of the one or more salient regions; and/or (3) histograms within the one or more salient regions.

A system that identifies salient images may include one or more processors, and/or other components. The processor(s) may be configured by machine-readable instructions. Executing the machine-readable instructions may cause the processor(s) to facilitate identifying salient images. The machine-readable instructions may include one or more computer program components. The computer program components may include one or more of an image information component, a saliency map component, a salient region component, a saliency metric component, and/or other computer program components.

The image information component may be configured to access image information and/or other information. Accessing image information may include one or more of acquiring, analyzing, determining, examining, locating, obtaining, receiving, retrieving, reviewing, storing, and/or otherwise accessing the image information. The image information may define an image and/or other information. The image may include a standalone image, an image from a set of images, a video frame of video content, and/or other images. The image may include one or more salient objects and/or other objects. The image information component may access image information from one or more locations. The image information component may be configured to access image information defining an image during capture of the image and/or after capture of the image by one or more image sensors.

The saliency map component may be configured to generate one or more saliency maps based on the image information and/or other information. A saliency map may include one or more regions corresponding to the salient object(s). The region(s) corresponding to the salient object(s) may be characterized by different (e.g., higher) levels of intensity than other regions of the saliency map. In some implementations, the saliency map may be generated using a single color space or multiple color spaces. In some implementations, the saliency map may be generated using connectivity of pixels within the image to a boundary of the image. In some implementations, generating the saliency map based on the image information may include generating a distance map per a channel of one or more color spaces. A distance map may be characterized by a path cost function and/or other information.

The salient region component may be configured to identify one or more salient regions around the salient object(s). The salient region(s) may be identified based on the saliency map and/or other information. The salient region(s) may be identified based on the intensities of the saliency map. In some implementations, the salient region(s) may be identified by one or more bounding boxes. The bounding box(es) may be extracted using a flood-fill algorithm and/or other information. In some implementations, the flood-fill algorithm may be started at a given pixel of the saliency map based on the given pixel having an intensity value meeting a threshold value and/or other information.

The saliency metric component may be configured to generate one or more saliency metrics for the image. The saliency metric(s) may be generated based on one or more of (1) sizes of the one or more salient regions; (2) an amount of the one or more salient regions; (3) histograms within the one or more salient regions, and/or (4) other information. In some implementations, the saliency metric(s) may be generated further based on one or more of (1) sizes of two biggest salient regions; (2) a comparison of the amount of the salient region(s) with a threshold number; (3) a threshold percentage of pixels inside the salient region(s) being characterized by a high intensity or a low intensity. In some implementations, the high intensity may include approximately top 4 percent of an intensity range of the image and the low intensity may include approximately bottom 4 percent of the intensity range of the image. In some implementations, the saliency metric(s) may be generated further based on one or more linear classifications of the image.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
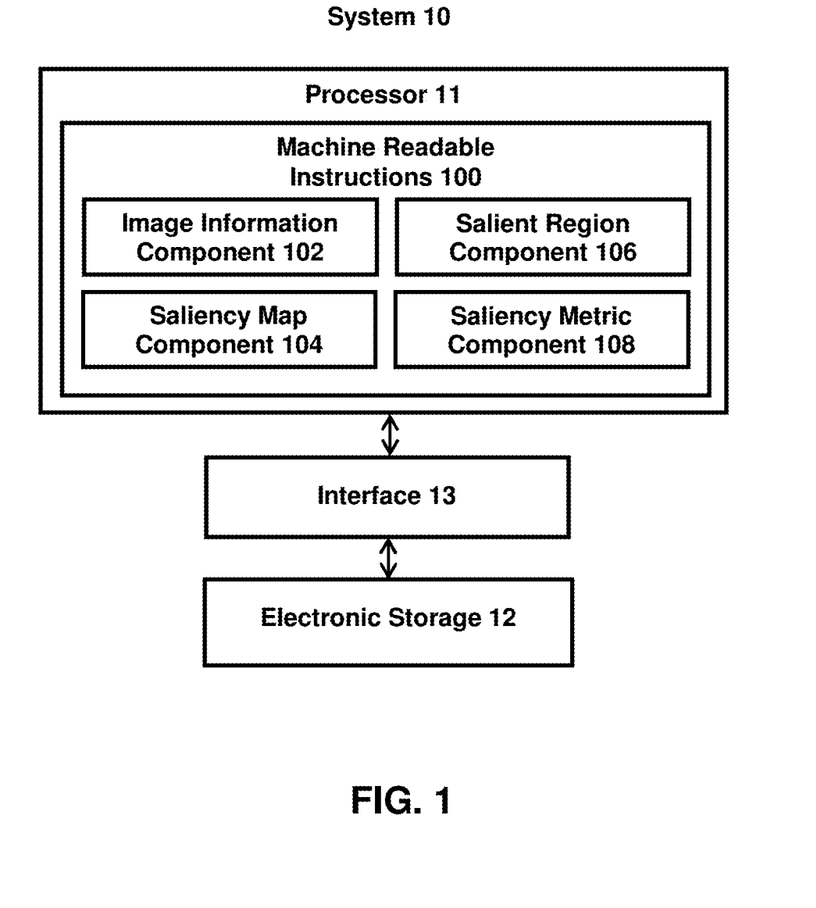
FIG. 1 illustrates a system that identifies salient images.

FIG. 1 illustrates a system 10 for identifying salient images. The system 10 may include one or more of a processor 11, an electronic storage 12, an interface 13 (e.g., bus, wireless interface), and/or other components. Image information defining an image may be accessed by the processor 11. The image may include one or more salient objects. A saliency map may be generated based on the image information. The saliency map may include one or more regions corresponding to the one or more salient objects. The one or more regions may be characterized by different (e.g., higher levels) of intensity than other regions of the saliency map. One or more salient regions around the one or more salient objects may be identified based on the saliency map. A saliency metric for the image may be generated based on one or more of (1) sizes of the one or more salient regions; (2) an amount of the one or more salient regions; and/or (3) histograms within the one or more salient regions.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to image information, images, video frames, video content, salient objects, saliency regions, saliency metrics, and/or other information.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate identifying salient images. The machine readable instructions 100 may include one or more computer program components. The machine readable instructions 100 may include one or more of an image information component 102, a salient map component 104, a saliency region component 106, a saliency metric component 108, and/or other computer program components.

The image information component 102 may be configured to access image information and/or other information. Accessing the image information may include one or more of acquiring, analyzing, determining, examining, locating, obtaining, receiving, retrieving, reviewing, storing, and/or otherwise accessing the video information. The image information may define an image and/or other information. The image may include a standalone image, an image from a set of images (e.g., live images, burst images), a video frame of video content, and/or other images. The image may include one or more salient objects and/or other objects. A salient object may refer to an object that is visually more noticeable than other objects within the image. A salient object may be smaller, larger, or the same size as other objects within the image. For example, referring to FIG. 3, salient objects within the image 300 may include floats 310, 320 and/or other objects.

The image information component 102 may access image information from one or more locations. For example, the image information component 102 may access the image information from a storage location, such as the electronic storage 12, electronic storage of information and/or signals generated by one or more image sensors (not shown in FIG. 1), electronic storage of a device accessible via a network, and/or other locations. The image information component 102 may access the image information from a hardware component (e.g., an image sensor) and/or a software component (e.g., software running on a computing device).

The image information component 102 may be configured to access image information defining an image during capture of the image and/or after capture of the image by one or more image sensors. For example, the image information component 102 may access image information defining an image while the image is being captured by one or more image sensors. The image information component 102 may access image information defining an image after the image has been captured and stored in memory (e.g., the electronic storage 12, buffer memory).

The saliency map component 104 may be configured to generate one or more saliency maps based on the image information and/or other information. A saliency map may include one or more regions corresponding to the salient object(s). The region(s) corresponding to the salient object(s) may be characterized by different (e.g., higher) levels of intensity than other regions of the saliency map. A saliency map may highlight salient objects while suppressing non-salient objects (e.g., background) in the image.

Figure 3:
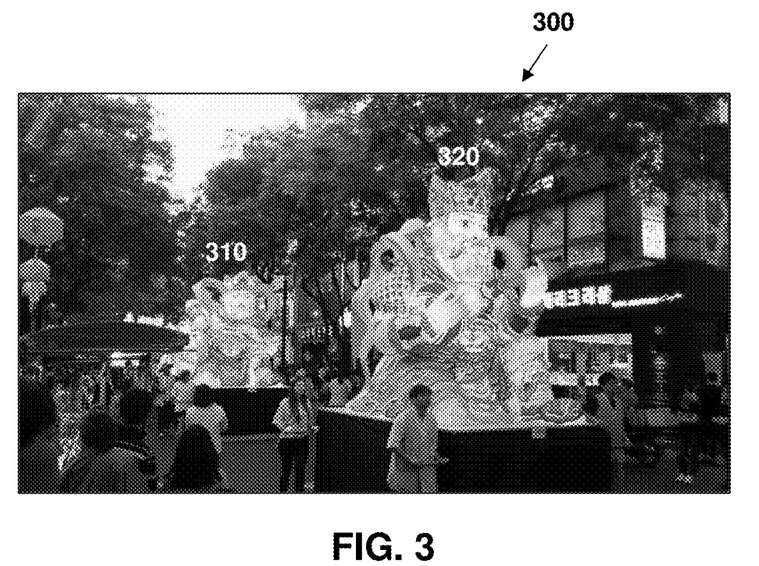
FIG. 3 illustrates an example image.
Figure 4:
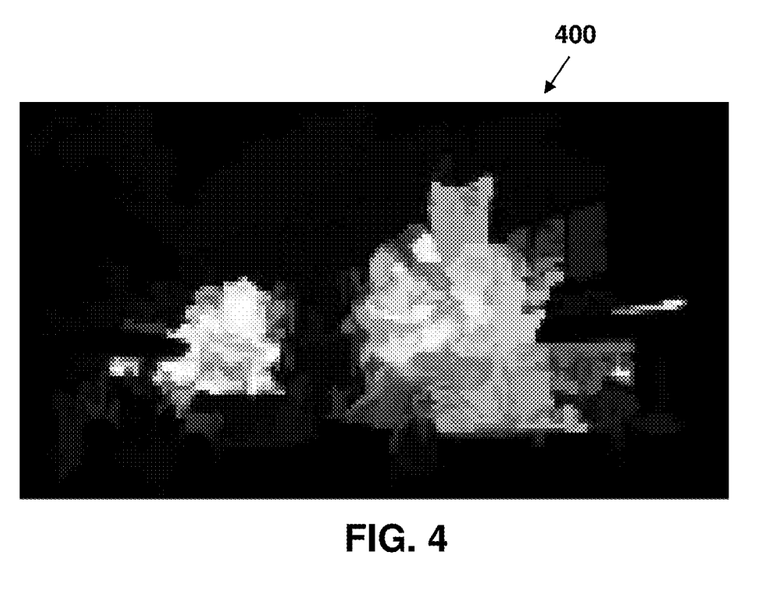
FIG. 4 illustrates an example saliency map for the image shown in FIG. 3.

For example, referring to FIG. 4, the saliency map component 104 may generate the saliency map 400 based on the image information for the image 300 and/or other information. The regions of the saliency map 400 corresponding to the floats 310, 320 may be characterized by higher levels of intensity than other regions of the saliency map 400.

In some implementations, the saliency map may be generated using connectivity of pixels within the image to a boundary of the image. Image boundary connectivity saliency detection may assume that non-salient objects are usually connected to the image boundary, while salient objects are not usually connected to the image boundary. Generating the saliency map using connectivity of pixels may include generating a distance map per a (color) channel of the image. In some implementations, the saliency map may be generated using a single color space or multiple color spaces.

The distance maps may be computed for individual channels and for individual pixels as the distance to boundary "seeds." A distance map may be characterized by a path cost function and/or other information. A path may include a sequence of connected pixels starting from a set of seeds. The seeds may be placed at the boundary of the image. A path cost function may refer to a cost computed on a path. The cost function may correspond to the distance from the first pixel to the last pixel of the path. The cost may be Euclidian (corresponding to the number of elements in the path), Geodesic (corresponding to the sum of the absolute difference between consecutive pixels values), or Minimum Barrier cost (corresponding to the absolute difference between the highest pixel value and the lowest pixel value inside the path). The distance map may correspond to the lowest value of the cost function for each path going to a given pixel, starting from all possible seeds.

To detect salient objects in the image, distance transforms may be used to calculate distance scores indicting connectivity to boundary per pixels. The distance scores may be calculated using a single color space or multiple color spaces. For example, the distance scores may be calculated using a YUV color space, which results in a score for Y channel (Y color distance), a score for U channel (U color distance), and a score for V channel (V color distance). The scores from different color channels may be combined to give the total distance scores. For example, the scores from individual color channels may be averaged (summed and then divided by the total number of color channels) to give the total distance scores. Other types of combinations are contemplated. Results may be improved by using additional color channels. Using more color channels/spaces may increase processing time. For example, distance scores may be calculated using both YUV color space and RGB color space. Other color spaces/combination of color spaces (e.g., YUV, RGB, LAB, HSB) may be used.

In some implementations, the saliency map may be post-processed (e.g., cleaned up) with one or more filters to enhance accuracy. For example, the saliency map may be post-processed with a downhill filter (a morphological operator performing efficient reconstruction-by-dilatation operation). This may smooth the saliency map and remove small/tiny parts in the saliency map to create bigger continuous regions.

The salient region component 106 may be configured to identify one or more salient regions around the salient object(s). For example, the salient region component 106 may identify salient regions around the floats 310, 320. The salient region(s) may be identified based on the saliency map and/or other information. The salient region(s) may be identified based on the intensities of the saliency map. For example, referring to FIGS. 3 and 4, salient regions around the floats 310, 320 in the image 300 may be identified based on intensities of the regions of the saliency map 400 corresponding to the floats 310, 320.

Figure 5:
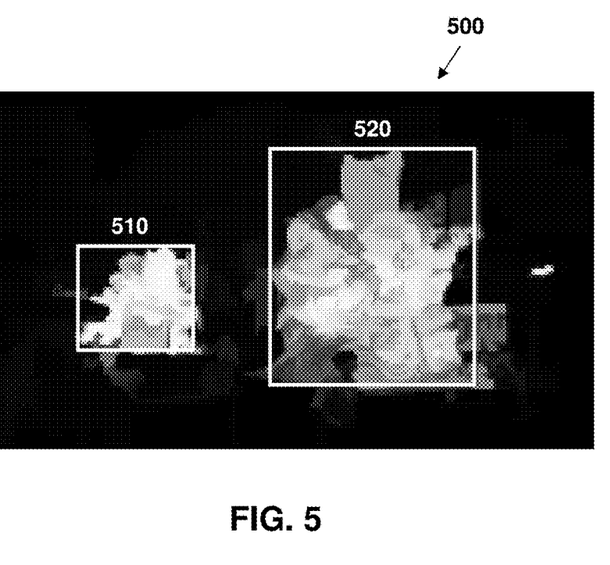
FIG. 5 illustrates example identification of salient regions.
Figure 6:
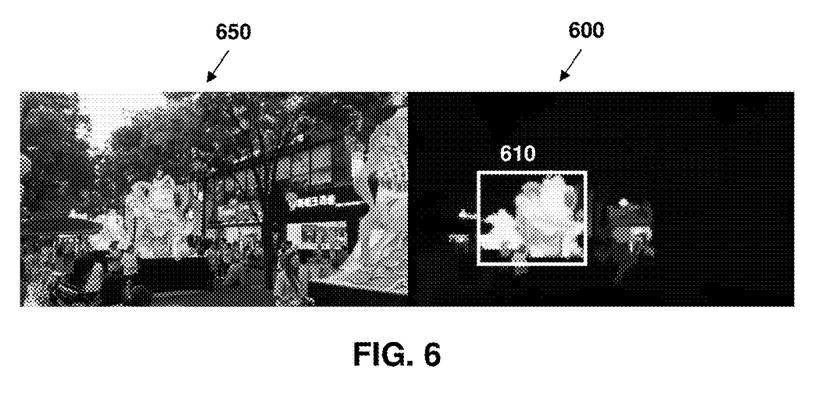
FIG. 6 illustrates example image, saliency map, and identification of salient regions.
Figure 7:
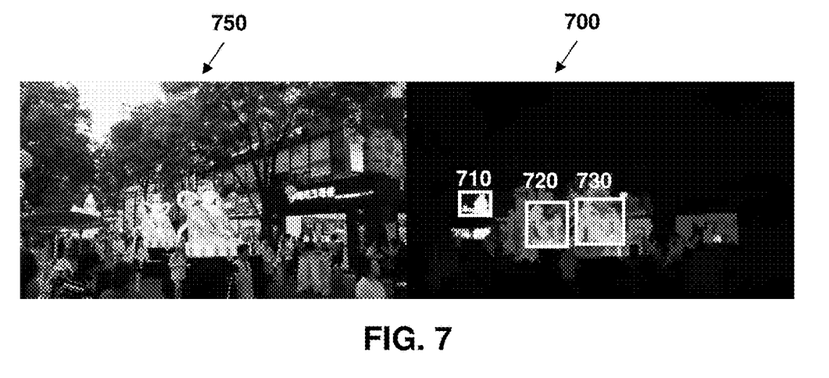
FIG. 7 illustrates example image, saliency map, and identification of salient regions.

In some implementations, the salient region(s) may be identified by one or more bounding boxes. For example, FIG. 5 shows example bounding boxes 510, 520 in the saliency map 500 identifying salient regions corresponding to the floats 310, 320, respectively. FIG. 6 shows a saliency map 600 with a salient region identified by a bounding box 610. The bounding box 610 may identify the region corresponding to a float in an image 650. FIG. 7 shows a saliency map 700 with salient regions identified by bounding boxes 710, 720, 730. The bounding boxes 710, 720, 730 may identify the regions corresponding to three floats in an image 750.

The bounding boxes 510, 520, 610, 710, 720, 730 may be extracted using a flood-fill algorithm and/or other information. A flood-fill algorithm may refer to a method of determining area connected to a node (a given pixel) in an array of nodes (e.g., a given image). The floodfill algorithm may estimate the bounding boxes around the salient regions in the saliency map.

The floodfill algorithm may explore contiguous pixels in the saliency map to extract the bounding boxes. To use the floodfill algorithm, the pixels of the saliency map may be reviewed systematically (e.g., the pixels are reviewed per row/column). The flood-fill algorithm may start at a given pixel of the saliency map based on the given pixel having intensity value(s) meeting a threshold value and/or other information. That is, when a pixel "salient enough" (meeting a threshold) is found, a recursive floodfill algorithm may used to flood the salient region. For example, a pixel salient enough may include a pixel having intensity value(s) superior/equal to a threshold (e.g., value of 128 on an image normalized between values of 0 and 256 (8-bit greyscale image)). The bounding box may be extracted when the salient region is completely flooded. The review of pixels may continue until the entire saliency map has been processed. Other shapes (e.g., non-rectangular boxes) and methods of identifying the salient regions are contemplated.

The saliency metric component 108 may be configured to generate one or more saliency metrics for the image. The saliency metric(s) may be generated based on one or more of (1) sizes of the salient region(s); (2) an amount of the salient region(s); (3) histogram(s) within the salient region(s), and/or (4) other information. In some implementations, the saliency metric(s) may be generated further based on one or more of (1) sizes of two biggest salient regions; (2) a comparison of the amount of the salient region(s) with a threshold number; (3) a threshold percentage of pixels inside the salient region(s) being characterized by a high intensity or a low intensity. The high intensity may include approximately top 4 percent of an intensity range of the image and the low intensity may include approximately bottom 4 percent of the intensity range of the image.

For example, the saliency metric component 108 may generate one or more saliency metrics for the images 300, 650, 750 based on the salient regions identified within the saliency maps 500, 600, 700, respectively. For example, the saliency metric(s) for individual images may be generated based on (1) whether the biggest salient region is at least a certain percentage (e.g., 30%) bigger than the second biggest salient region; (2) the amount of salient regions is less than, equal to, or greater than a certain number (e.g., the amount of salient regions is less than 5); and/or (3) at least a certain percentage (e.g., 90%) of pixels inside the salient regions are characterized by a high intensity or a low intensity.

A Boolean operation may be used to analyze the visuals contained within the salient regions. For example, an image be classified to be "good" if the biggest salient region (e.g., bounding box) is at least 30% bigger than the second biggest salient region. An image may be classified to be "good" if the amount of salient regions (e.g., bounding boxes) is less than five. An image may be classified to be "good" if the histogram inside the salient regions (e.g., bounding boxes) is "peaked" (90% of the pixels are either very white/very bright (e.g., intensity >245), or very black/very dark (intensity <10). Use of "peaked" salient regions may allow the saliency metric component 108 to favor images with very marked salient regions, such as a very bright region with a very dark background, while avoiding grey regions.

In some implementations, the saliency metric(s) may be generated further based on one or more linear classifications of the image. Linear classifications of the image may be performed using computer vision, machine learning, and/or other methods. For example, a simple linear classifier (SVM) may be performed on the images to determine whether the salient regions of the image contain "good" salient image/visuals or "bad" salient image/visuals. A set of images may be (manually) annotated and tagged as positive (e.g., when the salient region is clearly defined and "good," for example a single visible object with remarkable color) or negative (when the saliency is not meaningful, for example very spread and diffuse, with several tiny bounding boxes). The classifier may be used to provide a metric characering whether the saliency is "good."

The saliency metric may indicate whether the image is "good" (e.g., "clean enough") for one or more operations. For example, the saliency metric may indicate whether the image contains a single/enough meaningful object to tag the image for viewing by a user. The saliency metric may indicate whether the image contains object(s) that that "meaningful" in order to apply one or more visual effects. The visual effect(s) may be applied to the salient portions or the entire image. For example, the salient portion(s) of the image may be extracted (e.g., zoom, crop). The visual effects may be applied to a single image or video frames of a video.

In some implementations, an image may include one or more of spherical image, virtual reality image, and/or other images. Spherical image and/or virtual reality image may define visual content viewable from one or more points of.

Spherical image may refer to an image capture of multiple views from a single location. Spherical image may include a full spherical image capture (360 degrees of capture) or a partial spherical image capture (less than 360 degrees of capture). Spherical image may be captured through the use of one or more cameras/image sensors to capture images from a location. The captured images may be stitched together to form the spherical image.

Virtual reality image may refer to content that may be consumed via virtual reality experience. Virtual reality image may associate different directions within the virtual reality image with different viewing directions, and a user may view a particular directions within the virtual reality image by looking in a particular direction. For example, a user may use a virtual reality headset to change the user's direction of view. The user's direction of view may correspond to a particular direction of view within the virtual reality image. For example, a forward looking direction of view for a user may correspond to a forward direction of view within the virtual reality image.

While the description herein may be directed to images, one or more other implementations of the system/method described herein may be configured for other types media content. Other types of media content may include one or more of multimedia presentations, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, the processor 11 may be configured to execute one or more additional computer program components that may perform some or all of the functionality attributed to one or more of computer program components described herein.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
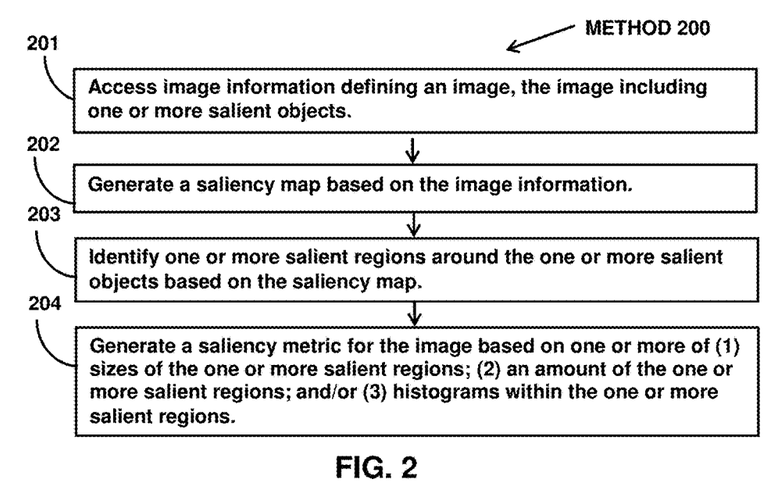
FIG. 2 illustrates a method for identifying salient images.

FIG. 2 illustrates method 200 for identifying salient images. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, image information defining an image may be accessed. The image may include one or more salient objects. In some implementation, operation 201 may be performed by a processor component the same as or similar to the image information component 102 (Shown in FIG. 1 and described herein).

At operation 202, a saliency map may be generated based on the image information. In some implementations, operation 202 may be performed by a processor component the same as or similar to the saliency map component 104 (Shown in FIG. 1 and described herein).

At operation 203, one or more salient regions around the one or more salient objects may be generated based on the saliency map. In some implementations, operation 203 may be performed by a processor component the same as or similar to the salient region component 106 (Shown in FIG. 1 and described herein).

At operation 204, a saliency metric may be generated based on one or more of (1) sizes of the one or more salient regions; (2) an amount of the one or more salient regions; and/or (3) histograms within the one or more salient regions. In some implementations, operation 204 may be performed by a processor component the same as or similar to the saliency metric component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that identifies salient images, the system comprising:
one of more physical processors configured by machine-readable instructions to:
access image information defining an image, the image including salient objects;
generate a saliency map based on the image information, the saliency map including regions corresponding to the salient objects, the regions characterized by different levels of intensity than other regions of the saliency map;
identify salient regions around the salient objects based on the saliency map, individual salient regions including individual salient objects and at least two of the salient regions having different sizes; and
generate a saliency metric for the image based on (1) a comparison of individual sizes of the salient regions; and (2) a number of the salient regions.

2. The system of claim 1, wherein the saliency map is generated using a single color space or multiple color spaces.

3. The system of claim 1, wherein the saliency map is generated using connectivity of pixels within the image to a boundary of the image.

4. The system of claim 1, wherein the one or more physical processors are, to generate the saliency map based on the image information, further configured by the machine-readable instruction to generate a distance map per a channel of one or more color spaces, the distance map characterized by a path cost function.

5. The system of claim 1, wherein the comparison of the individual sizes of the salient regions includes a comparison of relative sizes of two biggest salient regions, and the number of the salient regions is compared with a threshold number.

6. The system of claim 1, wherein the saliency metric is generated further based on histograms within the salient regions indicating that a threshold percentage of pixels inside the salient regions is characterized by a high intensity or a low intensity, the high intensity including top 4 percent of an intensity range of the image and the low intensity including bottom 4 percent of the intensity range of the image.

7. The system of claim 1, wherein the salient regions are identified by bounding boxes, the bounding boxes extracted using a flood-fill algorithm.

8. The system of claim 7, wherein the flood-fill algorithm is started at a given pixel of the saliency map based on the given pixel having an intensity value meeting a threshold value.

9. The system of claim 1, wherein the saliency metric for the image is further based on a linear classification of the image.

10. A method for identifying salient images, the method performed by a computing system including one or more physical processors, the method comprising:
accessing, by the one or more physical processors, image information defining an image, the image including salient objects;
generating, by the one or more physical processors, a saliency map based on the image information, the saliency map including regions corresponding to the salient objects, the regions characterized by different levels of intensity than other regions of the saliency map;

identifying, by the one or more physical processors, salient regions around the salient objects based on the saliency map, individual salient regions including individual salient objects and at least two of the salient regions having different sizes; and generating, by the one or more physical processors, a saliency metric for the image based on (1) a comparison of individual sizes of the salient regions; and (2) a number of the salient regions.

11. The method of claim 10, wherein the saliency map is generated using a single color space or multiple color spaces.

12. The method of claim 10, wherein the saliency map is generated using connectivity of pixels within the image to a boundary of the image.

13. The method of claim 10, wherein generating the saliency map based on the image information includes generating a distance map per a channel of one or more color spaces, the distance map characterized by a path cost function.

14. The method of claim 10, wherein the comparison of the individual sizes of the salient regions includes a comparison of relative sizes of two biggest salient regions, and the number of the salient regions is compared with a threshold number.

15. The method of claim 10, wherein the saliency metric is generated further based on histograms within the salient regions indicating that a threshold percentage of pixels inside the salient regions is characterized by a high intensity or a low intensity, the high intensity including top 4 percent of an intensity range of the image and the low intensity including bottom 4 percent of the intensity range of the image.

16. The method of claim 10, wherein the salient regions are identified by bounding boxes, the bounding boxes extracted using a flood-fill algorithm.

17. The method of claim 16, wherein the flood-fill algorithm is started at a given pixel of the saliency map based on the given pixel having an intensity value meeting a threshold value.

18. The method of claim 10, wherein the saliency metric for the image is further based on a linear classification of the image.

19. A system that identifies salient images, the system comprising:

one of more physical processors configured by machine-readable instructions to:

access image information defining an image, the image including salient objects;

generate a saliency map based on the image information, the saliency map is generated using connectivity of pixels within the image to a boundary of the image, the saliency map including regions corresponding to the salient objects, the regions characterized by different levels of intensity than other regions of the saliency map;

identify salient regions around the salient objects based on the saliency map, the salient regions identified by bounding boxes individual bounding boxes including individual salient objects and at least two of the bounding boxes having different sizes; and generate a saliency metric for the image based on (1) a comparison of individual sizes of the bounding boxes; and (2) a number of the bounding boxes.

20. The system of claim 19, wherein the one or more physical processors are, to generate the saliency map based on the image information, further configured by the machine-readable instruction to generate a distance map per a channel of one or more color spaces, the distance map characterized by a path cost function.

* * * * *